US008645195B1

(12) United States Patent
Shpritz et al.

(10) Patent No.: US 8,645,195 B1
(45) Date of Patent: Feb. 4, 2014

(54) REAL ESTATE ENVIRONMENTAL SUSTAINABILITY INDEX

(75) Inventors: Lisa R. Shpritz, Charlotte, NC (US); Benjamin T. Teal, Charlotte, NC (US); Jessica Halvorsen, Charlotte, NC (US); Gregory Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 736 days.

(21) Appl. No.: 12/546,789

(22) Filed: Aug. 25, 2009

(51) Int. Cl.
*G06Q 10/00* (2012.01)
*G06Q 40/00* (2012.01)

(52) U.S. Cl.
USPC ............................................. 705/10; 705/35

(58) Field of Classification Search
USPC ....................................................... 705/35, 10
See application file for complete search history.

(56) References Cited

U.S. PATENT DOCUMENTS

2005/0021389 A1* 1/2005 Dias et al. ........................ 705/10

OTHER PUBLICATIONS

Licon, Carlos V. "An Evaluation model of sustainable development possibilities"; Arizona State University; Dec. 2004.*
Shah, Kalim U. "Determinants of Corporate Environmental Responsibility in Emerging Economies: Evidence from Oil, Gas and Chemical Sectors of Trinidad and Tobago"; The University of the West Indies; 2007.*
GreenBiz.com presents "Getting Ready for the Sustainability Index", dated prior to Sep. 24, 2009.
European Search Report Application No. 10251481.7 mailed Dec. 22, 2010.
Notice from European Patent Office, XP007905525, dated Oct. 1, 2007.

* cited by examiner

*Primary Examiner* — Edward Chang
(74) *Attorney, Agent, or Firm* — Banner & Witcoff, Ltd.; Michael A. Springs

(57) ABSTRACT

Systems and methods of determining environmental sustainability of a piece of real estate or real estate portfolio are presented. The systems and methods may include identifying a plurality of sustainability inputs, such as recycling, carpet recycling, water use reduction, LEED certified space, renewable energy generation, green cleaning and environmental compliance. Values for each of the inputs may be determined and combined to determine a sustainability index for the property or portfolio. The index may be calculated monthly, quarterly, annually, etc. to track performance of the property and/or portfolio and to identify areas needing improvement.

18 Claims, 5 Drawing Sheets

REAL ESTATE ENVIRONMENTAL SUSTAINABILITY INDEX

BACKGROUND

These days, it seems, everyone is going green. In building and managing a real estate portfolio, conservation-minded individuals may be looking for ways to evaluate the environmental sustainability of a real estate portfolio. That is, it would be advantageous to provide builders, developers, property owners, etc. with a method and system of objectively evaluating the environmental sustainability of a portfolio in a manner that permits comparisons to be made between portfolios, properties, etc. In addition, it would be advantageous to provide a sustainability index that may aid in identifying trends over the life of the property or portfolio and which may be changed or adjusted as a direct result of management decisions in the real estate portfolio.

SUMMARY

The following presents a simplified summary in order to provide a basic understanding of some aspects of the disclosure. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to systems and methods for evaluating environmental sustainability of a building or real estate portfolio. The systems and methods may include identifying a plurality of sustainability inputs. The systems and methods may further include determining a value for each of the sustainability inputs of the plurality of sustainability inputs, and combining the determined value for each of the sustainability inputs to determine an environmental sustainability index for the piece of real estate. In some arrangements, the plurality of inputs may include recycling, green cleaning, Leadership in Energy and Environmental Design (LEED) certified space, renewable energy use, water use reduction, environmental compliance, carpet recycling, and the like.

Aspects of this disclosure may further relate to systems and methods of determining environmental sustainability of a real estate portfolio. The systems and methods may include identifying at least a first property and a second property in the real estate portfolio and identifying a plurality of sustainability inputs for the first property and the second property. In some examples, the systems and methods may further include determining a value for each of the sustainability inputs for the first property and combining the determined value for each of the sustainability inputs to determine a sustainability index for the first property. The systems and methods may further include determining a value for each of the sustainability inputs for the second property and combining the determined value for each of the sustainability inputs to determine a sustainability index for the second property. In some arrangements, the systems and methods may further include comparing the sustainability index of the first property and the second property.

Aspects of this disclosure may also relate to one or more computer-readable media storing computer readable instructions that, when executed, cause a processor to perform the methods described above.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to systems and methods for providing an assessment of the environmental sustainability of a real estate portfolio. The assessment may include determining a real estate sustainability index for the portfolio. The real estate sustainability index may be based on values for various sustainability index inputs that may be automatically selected or may be manually selected by a user. As used herein, a real estate portfolio may include one building or property or multiple buildings or properties and may include commercial, industrial, and/or residential properties.

Figure 1:
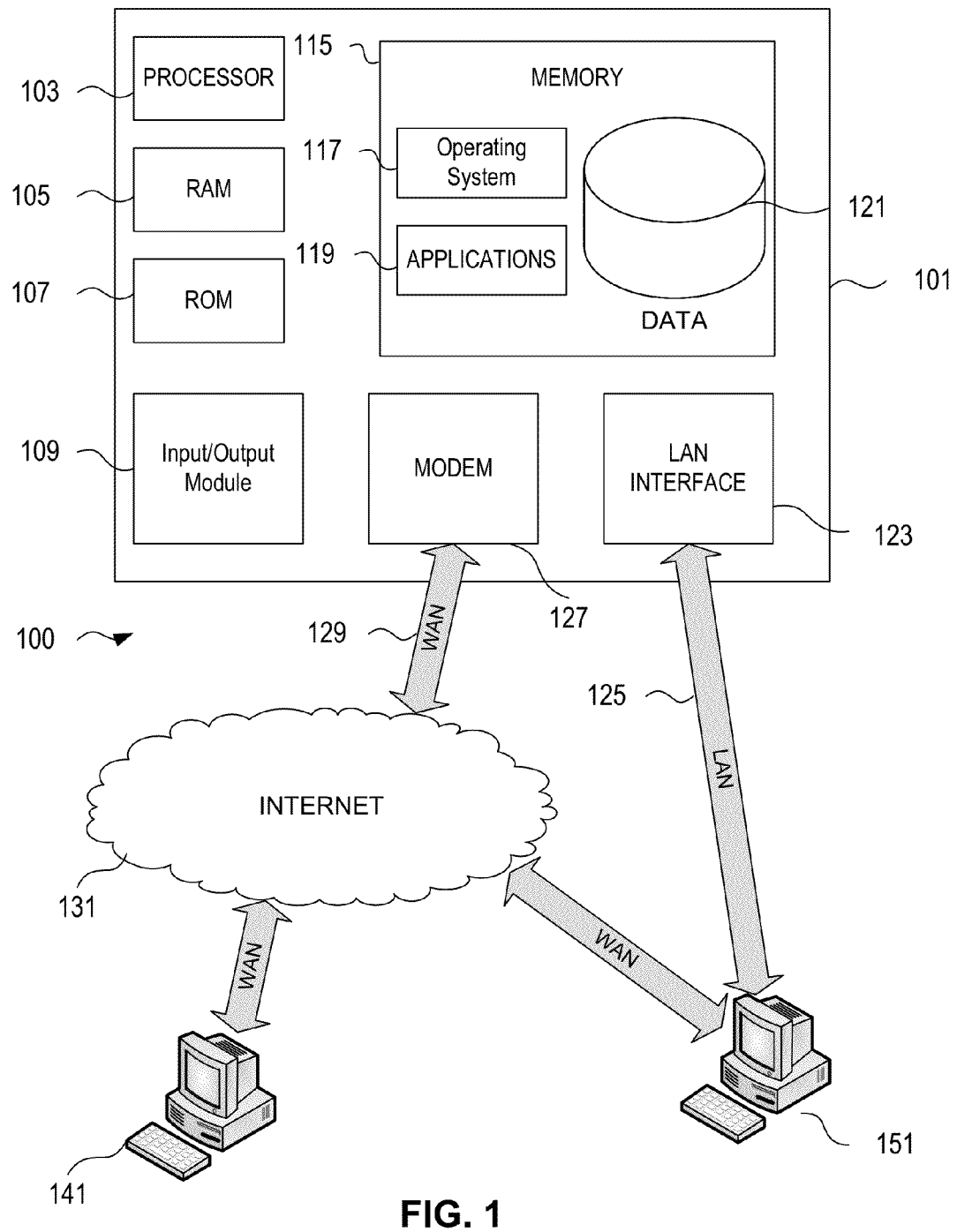
FIG. 1 illustrates an example of a suitable operating environment in which various aspects of the disclosure may be used.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals (e.g., mobile phones, PDAs, notebooks, etc.) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
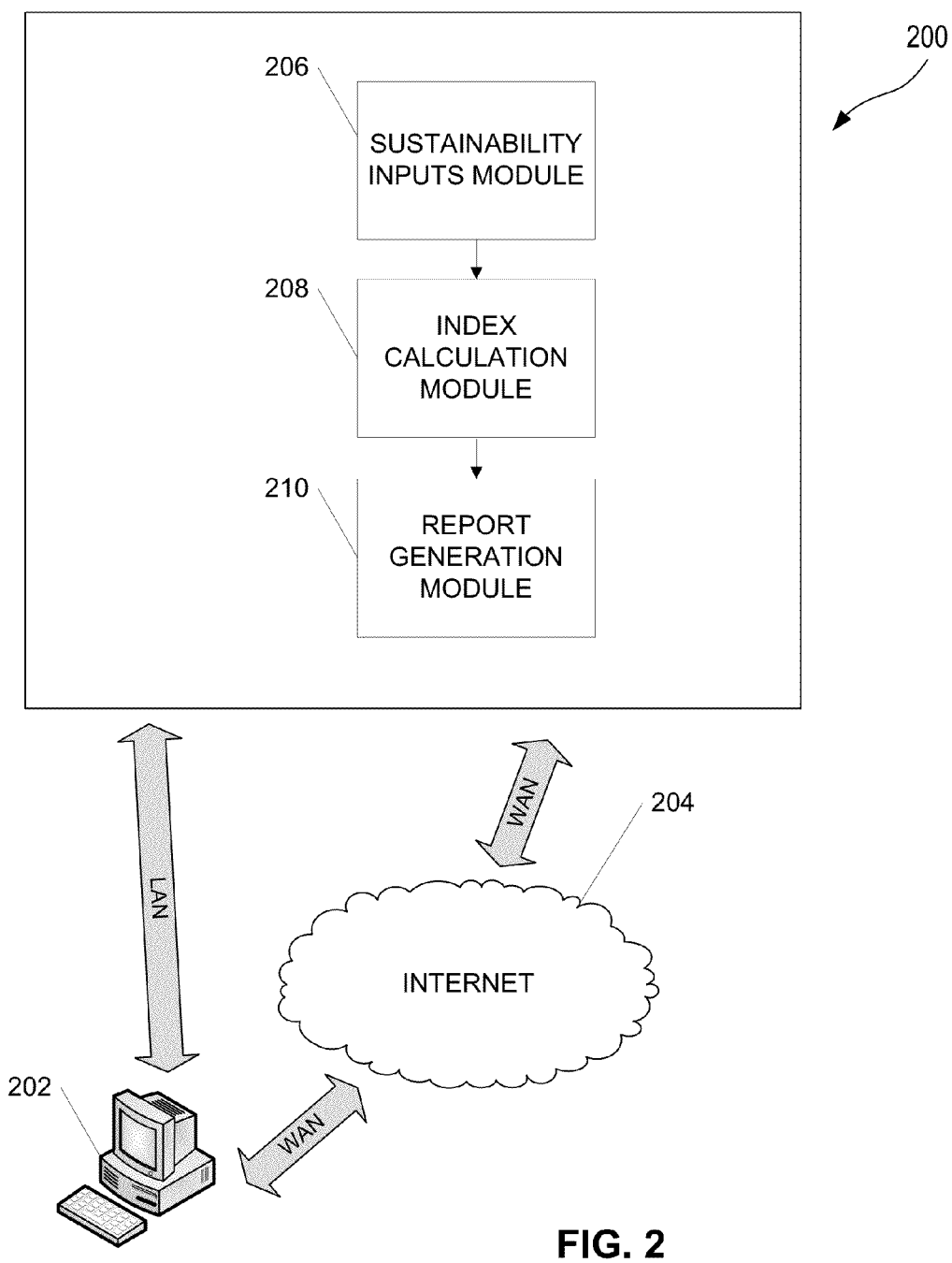
FIG. 2 illustrates a simplified diagram of a system for determining a real estate sustainability index in accordance with aspects described herein.

FIG. 2 illustrates one example computing environment 200 in which a system and method for determining a real estate sustainability index may be used. The components and modules described in the Figure may include firmware, hardware, software and/or combinations thereof. The real estate sustainability index system 200 may include a sustainability inputs module 206. The sustainability inputs module 206 may receive data related to various real estate sustainability index inputs. The data may be transmitted to the module 206 from the various real estate properties included in the index. Additionally or alternatively, the data may be received from a central data input location, such as user interface 202 which may connect to the system via one or more networks 204 (e.g., the Internet). In some arrangements, the data related to the various inputs may be automatically transmitted from various computer systems associated with the real estate properties included in the index, rather than being manually input into the system 200. For instance, water usage for a property may be determined and stored at a computer system local to one or more properties. The data relating to water usage may be automatically transmitted from the local computer system to the sustainability inputs module. In some examples, various data may be transmitted on a regular basis or at a predetermined time or date.

In some arrangements, the sustainability inputs module 206 may include various index inputs but all inputs maintained in the module 206 may not be included in the desired index. For example, the sustainability inputs module 206 may include inputs such as water usage or use reduction, Leadership in Energy and Environmental Design (LEED) certification factors, recycling, carpet recycling, green cleaning, renewable energy certificates and/or generated renewable energy, environmental compliance percentage, and the like. Although data for all inputs may be available, all inputs may or may not be considered in calculating a desired index. That is, some users may desire an index focused on energy and water and may only consider water reduction and renewable energy certificates and/or generated renewable energy in an index. Other users may be concerned with day to day green functions at a property and may consider recycling, green cleaning and water use reduction. Any combination of inputs may be used to determine a desired index. Additionally or alternatively, additional inputs may be included as desired. For instance, new standards for air purification in a building may be implemented and a user may desire to include air purity in an index. The air purity input, and associated data, may be input into the sustainability inputs module 206 and may be used, as desired, in various indices.

Real estate sustainability index system 200 may also include an index calculation module 208. The index calculation module 208 may identify data associated with user selected inputs and calculate a real estate sustainability index for those inputs. For instance, a user may determine that a real estate sustainability index should include water use reduction, renewable energy credits and/or generated renewable energy, green cleaning, recycling, carpet recycling, LEED certified square footage of the building or buildings, and environmental compliance percentage as inputs. The data collected for those inputs in the sustainability inputs module 206 may be combined in the index calculation module 208 to determine a real estate sustainability index for the desired property or properties. The real estate sustainability index is an objective measure of the environmental sustainability of the real estate property or properties based on the desired inputs. In one example, values or percentages for each of the inputs may be added together and divided by the number of inputs to obtain an average value as the overall sustainability index. The index may be used as a quantitative measure to compare environmental sustainability of various properties, track improvements, etc. in sustainability of properties, and the like.

One advantage of the real estate sustainability index described herein is the flexibility of the index. That is, the index may include various inputs that may be tailored to the desires of the user. Further, the index may be calculated for a single property or multiple properties in a portfolio. The index then provides an objective measure of comparison of sustainability between properties in the portfolio. In addition, calculating an index for multiple properties in a portfolio may permit a user to compare sustainability of the multiple properties within the portfolio to identify properties needing improvement. In addition, the index may be calculated for various time periods (e.g., monthly, quarterly, yearly, etc.) in order to track improvements or progress made in individual properties or in an overall real estate portfolio. Various reports may be generated illustrating these comparisons using the report generation module 210.

Figure 3:
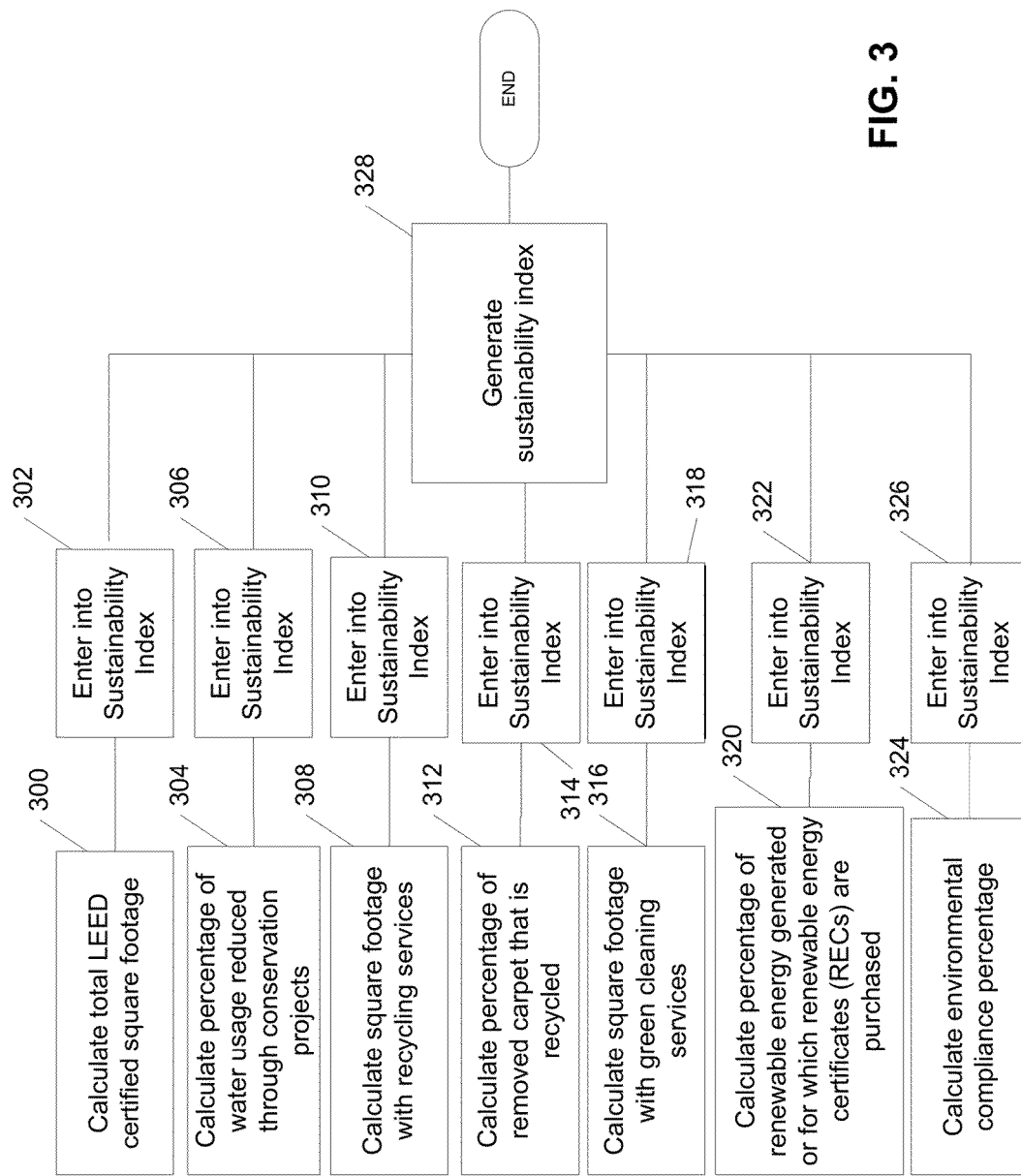
FIG. 3 is an example method of determining values for various inputs and combining the inputs to determine the sustainability index in accordance with aspects described herein.

FIG. 3 illustrates one example method of calculating a real estate sustainability index. In step 300 the total LEED certified square footage of a building or several buildings in a real estate portfolio is determined. Leadership in Energy and Environmental Design (LEED) was established by the United States Green Building Council and provides a third party certification of environmentally sustainable building achievement. LEED certification of the square footage of a building may be obtained from the Council and/or from its partner organization, the Green Building Certification Institute (GBCI) by meeting various predetermined standards. LEED encompasses various standards, including LEED-CI for commercial interiors, LEED-NC for new construction, LEED-EB for existing buildings, LEED-CS for core and shell. Any and/or all of these LEED standards may be considered in the LEED certified square footage input. However, the same portion of a building or square footage may not be counted under multiple LEED standards. For instance, if 200 square feet of a building are certified as LEED-CI space but the entire 1000 square feet of the building is certified under LEED-EB for existing buildings, then 1000 square feet is the LEED certified space, not 1200 square feet.

The LEED certified square footage input generally may be the number of LEED certified square feet in the building or portfolio divided by the total number of square feet in the building or portfolio multiplied by 100 to obtain a percentage of LEED certified square footage, as shown in the equation below. This percentage is entered into the real estate sustainability index in step 302.

$$\text{percentage of } LEED \text{ square footage} = \frac{\text{Number of } LEED \text{ Square Feet}}{\text{Total Number of Square Feet}} \times 100$$

In step 304, the water use reduction input is determined. The water use reduction input may, in some arrangements, include water usage reduced through various conservation projects. For instance, the reduction in water use obtained by replacing toilets having high gallon per flush to lower gallon per flush units may be included in the water use reduction input. In another example, water use reduction associated with installation of irrigation controllers and/or aerators on water fixtures may also be included. These water use reduction projects are merely examples of various water use reduction projects and nothing in the examples should be viewed as limiting the water use reduction input to only these examples of types of examples. The water use reduction input may generally be a water reduction in gallons, KGAL or CCF for a building or buildings in a portfolio divided by a value of total water used in the building or portfolio. The total water used may be in gallons, KGAL, or CCF. In some arrangements, units of measure may be consistent throughout the equation. This value is then multiplied by 100 to obtain a water use reduction percentage, as shown in the equation below that may be entered into the real estate sustainability portfolio in step 306.

$$\text{water use reduction} = \frac{\text{water reduction } (KGAL)}{\text{total water used } (KGAL)} \times 100$$

In another arrangement, the water use reduction may be a water reduction in gallons for a building or buildings in a portfolio divided by a baseline usage for the building or buildings from a previous year, such as the year before the current year. The total water used may be in gallons or KGAL. This value is then multiplied by 100 to obtain a water use reduction percentage, as shown in the equation below that may be entered into the real estate sustainability portfolio in step 306.

$$\text{water use reduction} = \frac{\text{water reduction } (KGAL)}{\text{baseline usage } (KGAL)} \times 100$$

In step 308 the recycling input may be determined. The recycling input value may include the total number of square feet of a building or buildings in a portfolio for which recycling is available, divided by the total number of square feet in the building or portfolio. This value is then multiplied by 100 to obtain a percentage of recycling square footage, as shown in the equation below, which is entered into the real estate sustainability index in step 310. For example, square footage included in the recycling input may have recycling available for glass, aluminum, steel, plastic, paper and cardboard.

$$\text{recycling} = \frac{\text{square feet for which recycling is available}}{\text{total square feet}} \times 100$$

In step 312 the carpet recycling input may be determined. The carpet recycling input value may include the total number of yards of carpet recycled for a building or buildings in a portfolio divided by the total number of yards of carpet removed from the building or buildings in the portfolio. In some arrangements, yards of carpet purchased may be used instead of yards of carpet removed if that information is unavailable. This value may then be multiplied by 100 to obtain a percentage of carpet recycled, as shown in the equation below, which is entered into the real estate sustainability index in step 314.

$$\text{carpet recycling} = \frac{\text{yards of carpet recycled}}{\text{yards of carpet removed}} \times 100$$

In step 316 the green cleaning input is determined. Green cleaning may generally include having a policy that includes use of environmentally sound cleaning products and procedures, as well cleaning performed using environmentally safe products, recycled products, and the like. For instance, green cleaning may include purchase of sustainable cleaning and hard floor and carpet care products, purchase of cleaning equipment meeting predetermined sustainability criteria, establishing standard operating procedures addressing how an effective cleaning and hard floor and carpet maintenance system will be utilized, managed, and audited, developing strategies for promoting and improving hand hygiene, developing guidelines addressing safe handling and storage of cleaning chemicals used in the building, developing requirements for staffing and training of maintenance personnel appropriate to the needs of the building, collecting occupant feedback, and the like. Various green cleaning standards, procedures, etc. can be found in the LEED for Existing Buildings Operations and Maintenance 2009 Manual. For instance, Indoor Environmental Quality Credits 3.1 to 3.5, as found in the above-referenced manual, generally outline a green housekeeping program that may be used in accordance with this input and the environmental sustainability index as described herein.

The green cleaning input may include the total number of square feet using green cleaning in a building or buildings in a portfolio divided by the total square footage in the building or portfolio. This value is then multiplied by 100 to obtain a percentage of square footage using green cleaning, as shown in the equation below, which is entered into the real estate sustainability index in step 318.

$$green\ cleaning = \frac{sq\ ft\ having\ green\ cleaning}{total\ sq\ ft} \times 100$$

In step 320 the renewable energy input may be determined. The renewable energy input may include renewable energy generated at the building or buildings in the portfolio, such as from a wind turbine, solar panel, geothermal unit, and the like, as well as any renewable energy credits (RECs) that are purchased. This input may be measured in megawatt hours (MWh) and may be divided by the total megawatt hours of power used at the building or buildings in the portfolio in a baseline year or other unit of time appropriate to the measure of total renewable energy produced or purchased. This value is then multiplied by 100 to obtain a percentage of renewable energy generated/certificates purchased, as shown in the equation below, and is entered into the sustainability index in step 322.

$$renewable\ energy = \\ \frac{renewable\ energy\ generated + RECs\ purchased\ (MWh)}{total\ power\ used\ (MWh)} \times 100$$

In step 324 the environmental compliance percentage is determined. The environmental compliance percentage may be a measure of the building or portfolio's compliance with various environmental regulations, such as clean air, water, and the like. The regulations may, in some arrangements, be provided by a governing body, such as a federal or state government. The environmental compliance percentage may include a plurality of regulations that, if applicable to the building or portfolio, may receive a score of 1 for each regulation for which the building is in compliance, or 0 for each applicable regulation for which the building is not in compliance. The scores are summed and divided by the number of regulations applicable to the facility and for which the facility received a score and may be summed across the portfolio for a portfolio score. This number is then multiplied by 100 to obtain a percentage, as shown in the equation below, and is entered into the sustainability index in step 326.

$$environmental\ compliance = \\ \frac{sum\ of\ applicable\ regulations\ in\ compliance}{number\ of\ applicable\ regulations} \times 100$$

In step 328, the input scores are combined to determine the overall sustainability index or index score. In some arrangements, the input scores may be added together or may be added together and divided by the number of inputs to obtain an index or index score. This value may then be used to track performance of the property or portfolio over various time periods, compare to other properties or portfolios, identify individual properties needed improvement, and the like.

Figure 4:
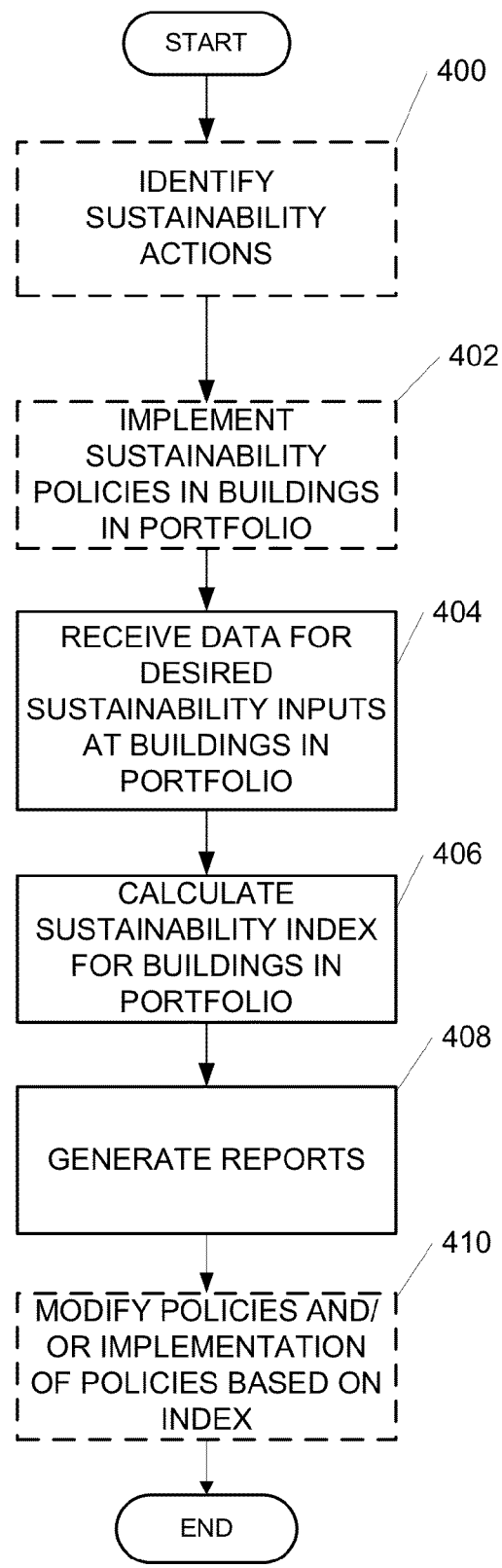
FIG. 4 illustrates one example method of determining a sustainability index for a real estate portfolio and generating reports based on the determined index in accordance with aspects described herein.

FIG. 4 illustrates one example method of determining a sustainability index for a real estate portfolio and generating reports based on the determined index. In optional step 400 various sustainability actions for the building or portfolio are identified and/or established. The policies may include goals for the property or portfolio and may include various government or governing body environmental regulations that are being implemented. In optional step 402 the identified sustainability processes are implemented in the building or portfolio. In step 404 data relating to inputs of the sustainability index is received for the building or portfolio. In step 406 the sustainability index is calculated based on the data received. Various reports may be generated in step 408 based on the calculated index and/or received data. In optional step 410 the identified sustainability actions and/or implementation of the actions may be modified to improve the sustainability index score.

Figure 5:
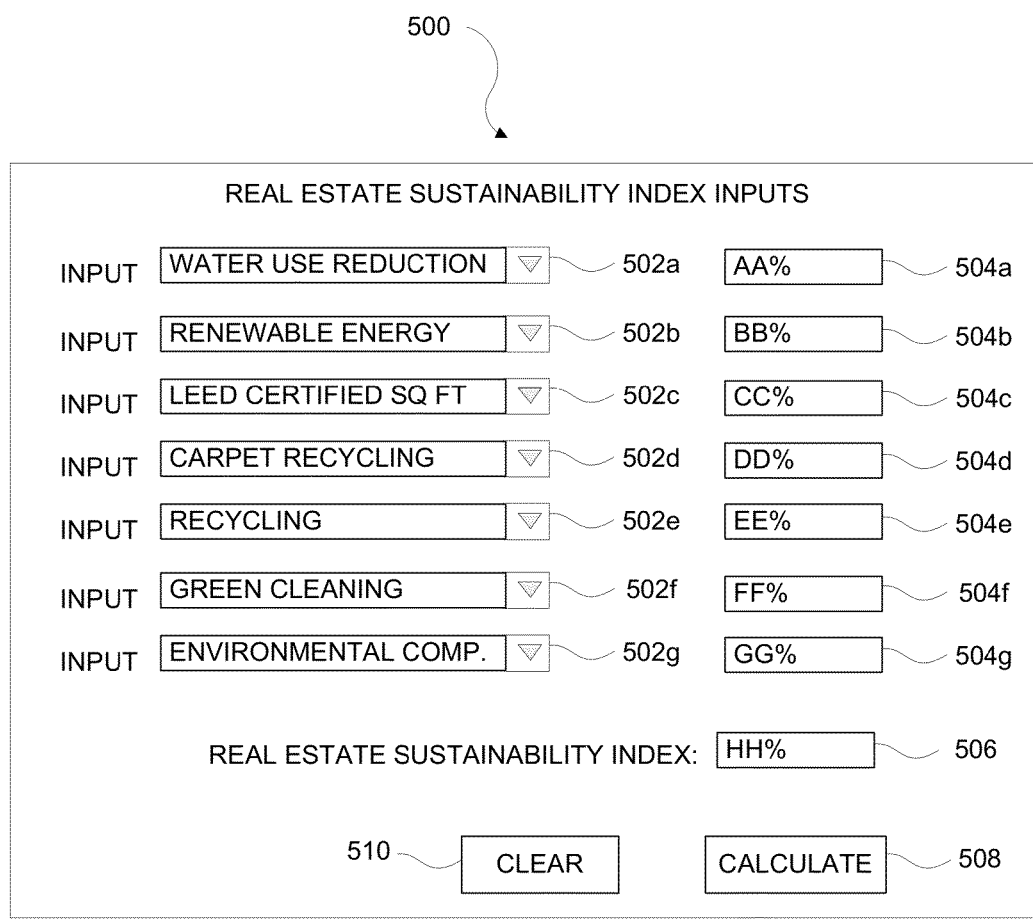
FIG. 5 illustrates one example user interface for selecting index inputs and determining the index value in accordance with aspects described herein.

FIG. 5 illustrates one example user interface 500 for selecting index inputs and determining the index value. The user interface 500 includes a plurality of fields 502a-502g for selecting inputs to include in the real estate sustainability index. In some arrangements, a user may select the input to include, such as from a drop down menu, selecting a radio button associated with a selection, etc. Additionally or alternatively, the inputs may be automatically selected based on the property or portfolio being evaluated. Although seven inputs are shown in FIG. 5, more or fewer inputs may be used to obtain the desired sustainability index, as desired by the user. Upon selection of the desired inputs, values for each input may be included in fields 504a-504g. The values may be percentages, decimals, etc. Once the values are input, the real estate sustainability index may be calculated by selecting a calculate button 508 and the index or score may be shown in field 506. As discussed above, the calculation may include adding together the various input scores to obtain an index or index score or, in some arrangements, adding the input values and dividing by a number of inputs in order to obtain the index or index score. Interface 500 may also include a clear button 510 that may clear all inputs and values present.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method of determining environmental sustainability of real estate, comprising:
    identifying, by a computing system having a processor, a plurality of sustainability inputs, at least one input of the plurality of sustainability inputs being automatically identified by the computing system based on a property associated with the real estate, wherein the plurality of sustainability inputs includes at least one of: water use reduction, carpet recycling, LEED certified space, green cleaning, environmental compliance, and renewable energy use;

determining, by the computing system, a value for each of the sustainability inputs of the plurality of sustainability inputs; and combining, by the computing system, the determined value for each of the sustainability inputs to determine an environmental sustainability index for the real estate.

2. The method of claim 1, wherein at least one of the plurality of sustainability inputs is water use reduction, and wherein the water use reduction input represents water reduction in gallons for the property divided by total gallons of water used for the property.

3. The method of claim 1 wherein at least one of the plurality of sustainability inputs is carpet recycling, and wherein the carpet recycling input represents total yards of carpet recycled in the property divided by a total number of yards of carpet removed from the property.

4. The method of claim 1, wherein the plurality of sustainability inputs includes recycling and wherein the recycling input represents a number of square feet in the property having access to recycling divided by a total number of square feet in the property.

5. The method of claim 1, wherein at least one of the plurality of sustainability inputs is green cleaning, and wherein the green cleaning input represents a number of square feet in the property using green cleaning supplies and methods divided by a total number of square feet in the property.

6. The method of claim 1, wherein combining the determined value for each of the sustainability inputs includes adding the determined values of the sustainability inputs and dividing the sum by the number of inputs.

7. A method of determining environmental sustainability of a real estate portfolio, comprising:
identifying, by a computing system having a processor, at least a first property and a second property in the real estate portfolio;
identifying, by the computing system, a plurality of sustainability inputs for the first property and the second property, at least one sustainability input of the plurality of sustainability inputs being identified automatically by the computing system based on the first property or the second property, wherein the plurality of sustainability inputs includes at least one of LEED certified space, water use reduction, renewable energy generation, green cleaning, carpet recycling, and environmental compliance;
determining, by the computing system, a value for each of the sustainability inputs for the first property;
combining, by the computing system, the determined value for each of the sustainability inputs to determine a sustainability index for the first property;
determining, by the computing system, value for each of the sustainability inputs for the second property;
combining, by the computing system, the determined value for each of the sustainability inputs to determine a sustainability index for the second property; and
comparing, by the computing system, the sustainability index of the first property and the second property.

8. The method of claim 7, wherein at least one of the at least one of the plurality of sustainability inputs is water use reduction, and wherein the water use reduction input represents a water reduction in gallons for the first property or the second property divided by total gallons of water used for the first property or the second property.

9. The method of claim 7, wherein at least one of the plurality of sustainability inputs is carpet recycling, and wherein the carpet recycling input represents total yards of carpet recycled in the first property or the second property divided by a total number of yards of carpet removed from the piece of real estate.

10. The method of claim 7, wherein the plurality of sustainability inputs includes recycling and wherein the recycling represents a number of square feet in the first property or second property having access to recycling divided by a total number of square feet in the first property or second property.

11. The method of claim 7, wherein at least one of the plurality of sustainability inputs is green cleaning, and wherein the green cleaning input represents a number of square feet in the first property or second property using green cleaning supplies and methods divided by total number of square feet in the first property or second property.

12. The method of claim 7, wherein comparing the sustainability index of the first property and the second property includes comparing to identify a property needing improvement.

13. The method of claim 7, further including generating reports based on the determined sustainability index for at least one of the first and second property.

14. The method of claim 7, wherein combining the determined value for each of the sustainability inputs to determine a sustainability index includes adding the determined values for each of the inputs and dividing the sum by a total number of inputs.

15. One or more non-transitory computer-readable media storing computer readable instructions that, when executed, cause a processor to perform a method, comprising:
identifying at least a first property and a second property in the real estate portfolio;
identifying a plurality of sustainability inputs for the first property and the second property, at least one sustainability input of the plurality of sustainability inputs being automatically identified based on the first property or the second property, wherein the plurality of sustainability inputs includes at least one of LEED certified space, water use reduction, renewable ene use Green cleaning, carpet recycling, and environmental compliance;
determining a value for each of the sustainability inputs for the first property;
combining the determined value for each of the sustainability inputs to determine a sustainability index for the first property;
determining a value for each of the sustainability inputs for the second property;
combining the determined value for each of the sustainability inputs to determine a sustainability index for the second property; and
comparing the sustainability index of the first property and the second property.

16. The one or more non-transitory computer-readable media of claim 15, wherein comparing the sustainability index of the first property and the second property includes comparing to identify a property needing improvement.

17. The one or more non-transitory computer-readable media of claim 15, further including generating reports based on the determined sustainability index for at least one of the first and second property.

18. The one or more non-transitory computer-readable media of claim 15, wherein combining the determined value for each of the sustainability inputs to determine a sustainability index includes adding the determined values for each of the inputs and dividing the sum by the number of inputs.

* * * * *